United States Patent [19]

Eyerly et al.

[11] Patent Number: 5,769,748

[45] Date of Patent: Jun. 23, 1998

[54] GIMBAL EMPLOYING DIFFERENTIAL COMBINATION OF OFFSET DRIVES

[75] Inventors: Bruce N. Eyerly, Torrance; Vytas J. Katilius, Manhattan Beach; Umesh S. Ketkar, Redondo Beach, all of Calif.

[73] Assignee: Hughes Electronics Corporation, Los Angeles, Calif.

[21] Appl. No.: 786,353

[22] Filed: Jan. 16, 1997

[51] Int. Cl.[6] .................................................. F16H 37/06
[52] U.S. Cl. ................................. 475/5; 475/7; 475/150; 475/223; 74/665 F; 74/665 GB; 74/665 M
[58] Field of Search .................................. 475/2, 5, 7, 9, 475/14, 150, 153, 220, 223, 226, 221; 74/665 L, 665 M, 665 F, 665 GB

[56] References Cited

U.S. PATENT DOCUMENTS

| | | |
|---|---|---|
| 2,785,369 | 3/1957 | Ligh ............................. 475/7 X |
| 2,992,563 | 7/1961 | Lassen ........................... 475/9 X |
| 4,175,451 | 11/1979 | Ward ............................. 475/9 X |
| 4,515,026 | 5/1985 | Perkins ......................... 475/153 X |
| 4,746,826 | 5/1988 | Burney ......................... 475/153 X |
| 5,342,254 | 8/1994 | Sula ............................. 475/223 X |
| 5,415,595 | 5/1995 | Nelson ............................. 475/7 |
| 5,501,522 | 3/1996 | Tung ........................... 475/221 X |
| 5,509,866 | 4/1996 | Weightman ....................... 475/9 X |

*Primary Examiner*—Charles A. Marmor
*Assistant Examiner*—Peter T. Kwon
*Attorney, Agent, or Firm*—Georgann S. Grunebach; Terje Gudmestad; Michael W. Sales

[57] ABSTRACT

A gimbal system includes a pair of stepper motors that drive respective drive trains of a differential drive assembly such as a differential gear assembly. Either the drive ratios or the step sizes for the two motors are offset from each other to provide four modes of operation, including modes for improved resolution and faster slew rate, and two intermediate modes with more balanced resolution and slew rate.

15 Claims, 3 Drawing Sheets

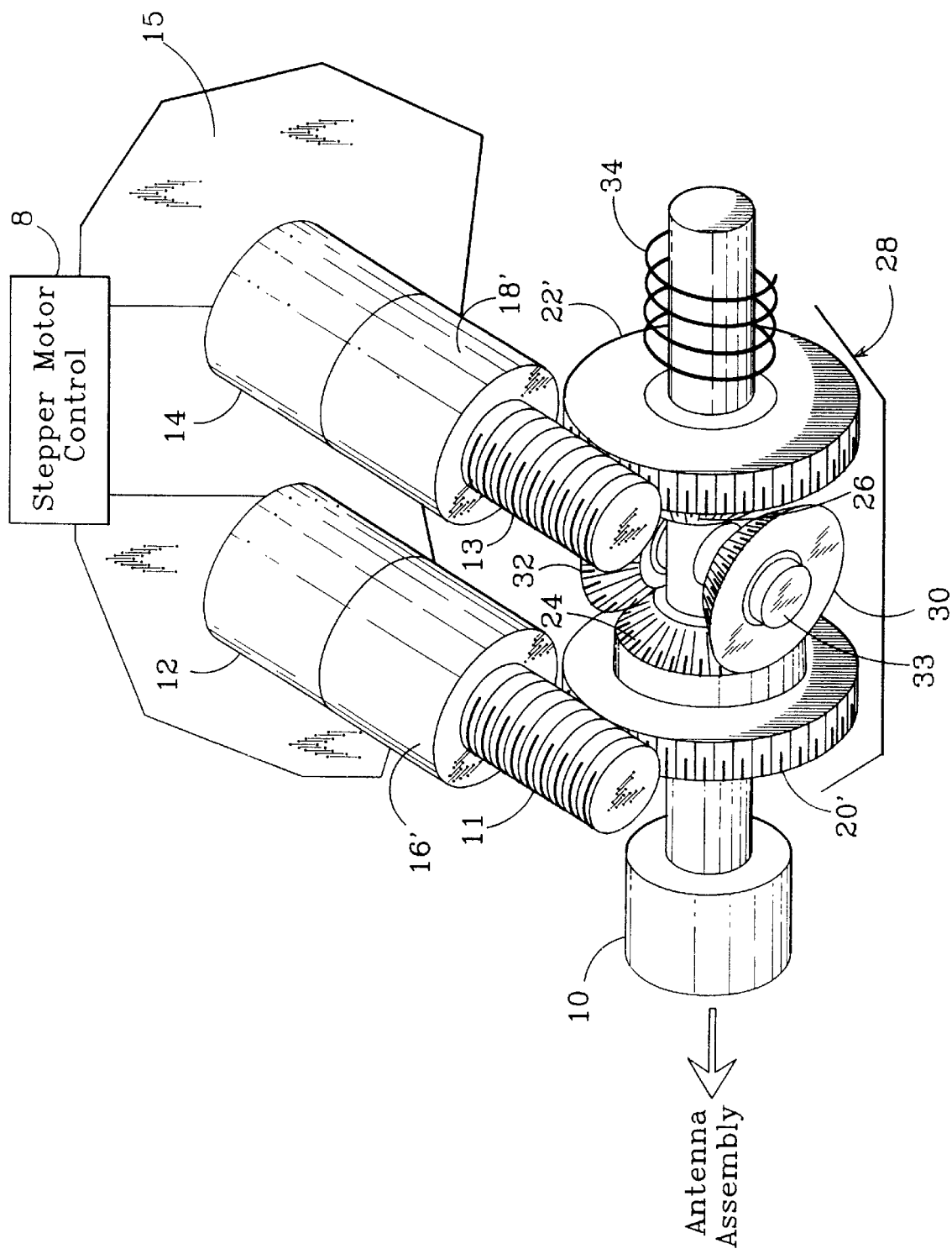

5,769,748

GIMBAL EMPLOYING DIFFERENTIAL COMBINATION OF OFFSET DRIVES

BACKGROUND OF THE INVENTION

1. Field of the Invention

The invention relates to a gimbal system for pointing an appendage such as an antenna. More specifically, the gimbal includes a pair of stepper motors connected by drive trains to the antenna. The drive trains have offset drive ratios that are mathematically combined in a differential drive assembly to provide four modes of operation, including modes for improved resolution and slew rate.

2. Description of the Related Art

FIG. 1 shows a prior electromechanical gimbal manufactured by Hughes Aircraft Company similar to those used in two MILSTAR military communication satellites launched in 1993 and 1995. It has an output shaft 10 coupled directly to a space vehicle antenna assembly to provide rotational power to move it along one axis. There is a gimbal mechanism used for both the azimuth and elevation axes. Identical stepper motors 12,14 are anchored to the space vehicle's frame 15 and have a step rate of up to 400 step/sec. with a step size of 45°. Two stepper motors are used for redundancy purposes. They are coupled to a pair of identical gearheads 16,18 that transfer the stepper motor output to a differential gear assembly 28. This assembly includes worm wheels 20,22 coupled to worm gears 11,13, bevel gears 24,26 fixed axially to worm wheels 20,22 and differential bevel gears 30,32 which mesh with bevel gears 24,26.

The differential bevel gears 30,32 are connected by a shaft 33 that runs through an opening in the output shaft 10 to rotate the output shaft about its longitudinal axis when one of the stepper motors drives its associated worm wheel. For example, assume that gearhead 18 on stepper motor 14 engages worm wheel 22 and causes it to rotate clockwise, as seen from the right hand side of FIG. 1. Bevel gear 26 will also rotate clockwise, while bevel gear 24 remains stationary. The rotation of bevel gear 26 causes the differential bevel gears 30,32 to rotate in opposite directions about the longitudinal axis of their shaft 33; as seen from the front, gear 30 will rotate counter-clockwise and gear 32 clockwise. Since the teeth of rotating gears 30,32 mesh with the teeth of stationary gear 24, their rotation causes gears 30,32, attached to shaft 33, to advance in a clockwise rotation relative to the stationary gear 24.

Differential gear assembly 28 allows the output of either stepper motor to be transferred to output shaft 10. The gear ratio for each gear train between stepper motor 12,14 and output shaft 10 may be of the order of 43,200:1, with the stepper motor moving 43,200 revolutions to one revolution of the output shaft. A backlash spring 34 preloads the differential gear assembly 28 and removes backlash from the system; the spring retainer on the opposite side of the spring from the worm wheel 22 is not shown.

Normally, one stepper motor 12 or 14 is driven while the other remains stationary for redundancy purposes. If stepper motor 12 is driven, its output is at rates up to 400 steps/sec at 45°/step. This output is coupled through gearhead 16 to worm wheel 20, then to bevel gear 24 and finally to differential bevel gears 30,32, which rotate about both their own axis and the axis of output shaft 10 to drive the output shaft. Since stepper motor 14 is inactive, bevel gear 26 is stationary and does not add or subtract any motion to differential bevel gears 30,32.

The slew rate (output shaft 10 rotational speed), which determines how fast the antenna moves, and the resolution, which determines how accurately the antenna points, are the most important output parameters for output shaft 10 and are obtained from the equations:

$$\text{Slew Rate} = \frac{mr}{g1} \quad \text{a)}$$

$$\text{Resolution} = \frac{m}{g1} \quad \text{b)}$$

where:

motor step size=m (degrees/step)

max step rate=r (steps/sec.)

gear train ratio=g1

Example m=45°/step r=400 steps/sec.

g1=43,200

Slew rate=0.4166°/sec.

Resolution=0.0010°/step

The prior gimbal is limited to the slew rate and resolution that can be obtained from using a single stepper motor; higher slew rates and finer resolution would be desirable.

SUMMARY OF THE INVENTION

A gimbal system having two stepper motors operates both motors simultaneously to improve both resolution and slew rate. A stepper motor control circuit controls the on/off state and direction of rotation of the stepper motors, which are coupled to two drive actuators having offset drive ratios. A differential drive assembly receives and combines the outputs of the drive actuators to produce an output having a drive ratio which is a mathematical combination of the drive ratios of the drive trains formed by the drive actuators and differential drive assembly. This output is provided to an output shaft. The stepper motors may be driven in opposition, additively, or individually to respectively produce an improved resolution mode, an improved slew rate mode, and two intermediate modes having more balanced slew rates and resolutions. These modes can be achieved with either offset drive ratios or offset step sizes.

DESCRIPTION OF THE DRAWINGS

FIG. 3 shows the details of the gimbal system of FIG. 2.

DETAILED DESCRIPTION OF THE INVENTION

Figure 1:
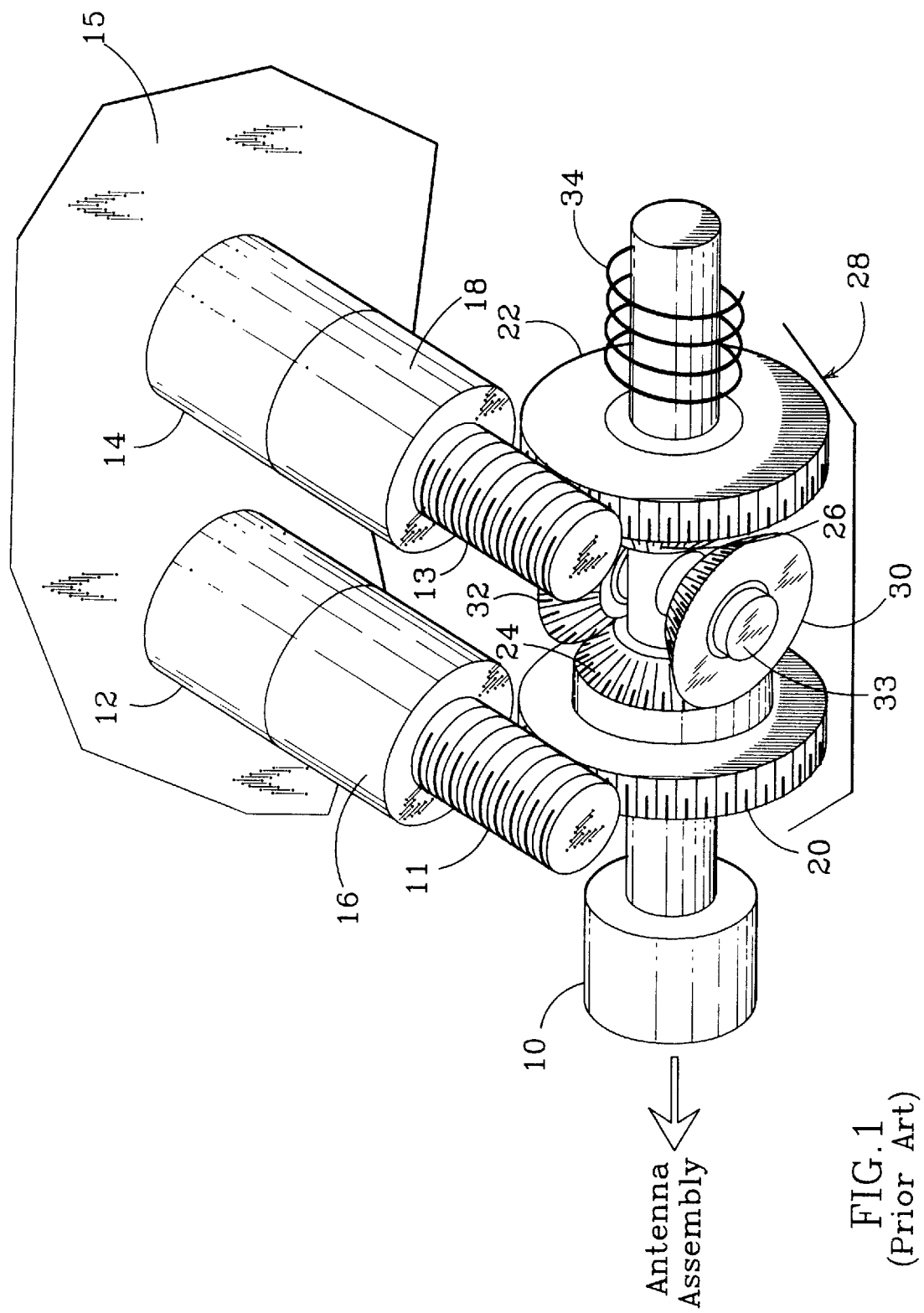
FIG. 1 is a perspective view of a prior electromechanical gimbal system for use on a space vehicle.
Figure 2:
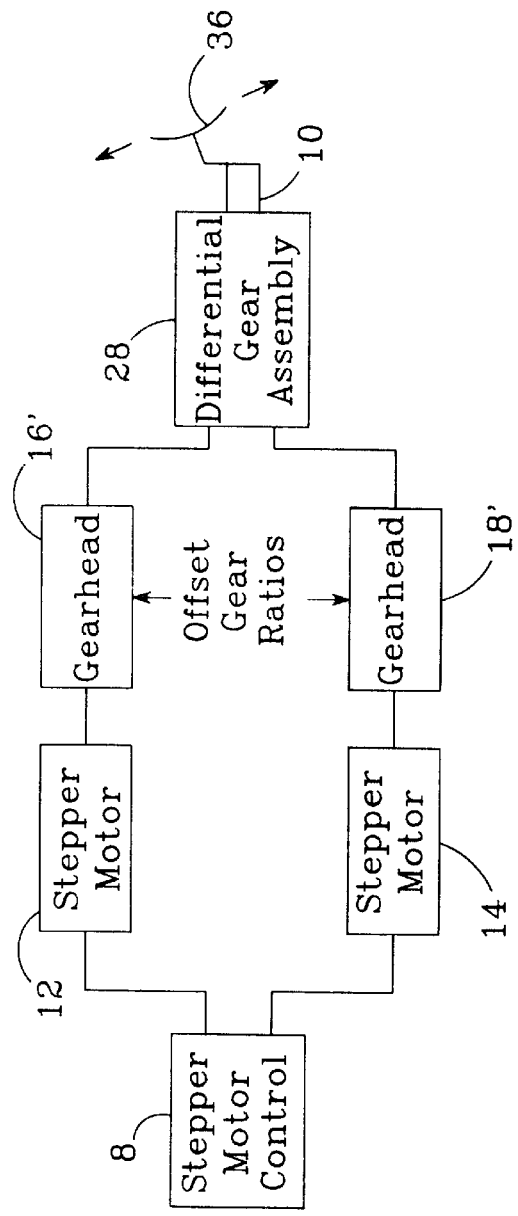
FIG. 2 is a block diagram of the gimbal system of FIG. 1 using offset gear ratios and adding a stepper motor control.

FIG. 2 shows a block diagram of the gimbal system of FIG. 1, but with a stepper motor control 8 added and the gear ratios between stepper motors 12,14 and output shaft 10 slightly offset in accordance with the invention. The invention is applicable to numerous different kinds of differential drive systems, including systems that use gears, belts and pulleys, fluid couplings or magnetic couplings. While details of specific gear drive systems are described herein for purposes of illustration, the invention is not limited to gear drives. Stepper motor control 8 controls the on/off state and rotational direction of stepper motors 12, 14. Either motor may be operated while the other is stationary. In addition, the motors may be operated in opposition, with opposite directions of rotation, or additively with the same direction of rotation. Stepper motors 12,14 are again assumed to have step rates of up to 400 steps/second and step sizes of 45°. Their outputs are coupled by drive trains implemented as gear trains that include drive actuators in the form of gearheads 16',18' and a differential drive assembly in the form of a differential gear assembly 28 to output shaft 10, which is illustrated as controlling the rotation of an antenna 36. The gear ratios for the gear trains between stepper motors 12,14 and output shaft 10 are slightly offset from each other, for example 6923 and 7500 respectively. They are preferably offset by using a gear ratio for gearhead 16'/worm wheel 20 that is different from the gear ratio for gearhead 18'/worm wheel 22.

In operation stepper motor control 8 controls the on/off state and rotational direction of each stepper motor so there are four possible modes of operation. These include a fine pointing mode in which resolution in pointing the antenna is high and the slew rate is low by operating the stepper motors in opposition to each other, a slew mode in which the antenna is moved at a high slew rate but resolution is low by operating the stepper motors additively, and two intermediate modes in which one stepper motor is activated while the other is stationary to make the slew rate capability and resolution more balanced.

The following equations show the relationship of the gear ratios to both resolution and slew rate and how to calculate the necessary gear ratios to obtain desired resolution and slew rates.

Motor step size=m (degrees/step)

Max step rate=r (step/sec.)

gear train ratios=g1,g2

Slew mode (high slew rate)

$$\text{output speed} = \frac{mr}{g1} + \frac{mr}{g2} = \frac{mr(g1+g2)}{g1g2} = \tilde{\omega}$$

Fine pointing mode (high resolution)

$$\text{resolution} = \frac{m}{g1} - \frac{m}{g2} = \frac{m(g2-g1)}{g1g2} = \theta$$

To find the gear ratios g1 and g2 necessary for high slew rate and resolution, solve the two equations for g1 and g2.

$$g1 = \frac{2mr}{\tilde{\omega}+\theta} \text{ and } g2 = \frac{2mr}{\tilde{\omega}-\theta}$$

Example m=45° r=400 step/sec.

ω=5°/sec. (desired slew rate)

θ=0.0005°/step (desired resolution)

Substituting in the equations for g1 and g2, the results are:

g1=6923
g2=7500

Using the above example and equations, the four modes of operation have the following slew rates and resolutions:

Fine pointing mode
resolution θ=0.0005°/step
slew rate ω=0.2°/sec
Intermediate mode #1
g1=7500
resolution θ=0.0060°/step
slew rate ω=2.4°/sec
Intermediate mode #2
g2=6923
resolution θ=0.0065°/step
slew rate ω=2.6°/sec
Slew mode
resolution θ=0.0125°/step
slew rate ω=5°/sec In the fine pointing mode the effective gear ratio is:

$$\frac{g2-g1}{g1g2}$$

or 90,000:1 for the assumed values given above. This is more than twice the prior gear ratio of 43,200:1 and allows the stepper motors to be operated at far lower actual individual gear ratios (6923 and 7500). The much higher prior actual gear ratio results in high stress in the gear train, and yet yields a resolution that is lower by a factor of two.

In the slew mode the effective gear ratio is:

$$\frac{g1+g2}{g1g2}$$

or 3600:1 for the assumed values. The reduced effective gear ratio allows the stepper motors to be operated at lower speeds to obtain the desired slew rate. This eliminates the prior need for high speed motors to obtain improved slew rates, and requires significantly less power consumption.

FIG. 3 shows the details of the apparatus of FIG. 2. The apparatus is similar to that of FIG. 1, except stepper motor control 8 is added and gearheads 16', 18' have different gear ratios. Stepper motor control 8 is preferably a microprocessor which controls the on/off state and direction of rotation for each motor. Stepper motors 12, 14 are coupled to gearheads 16', 18' which have gear ratios of 28.85 and 31.25 with their respective worm wheels 20' and 22'. These ratios are determined by dividing the gear ratio between the stepper motors and output shaft 10 by the gear ratio of 240 for the differential gear assembly 28.

$$\text{gearhead ratios } \frac{6923}{240} = 28.85$$

$$\frac{7500}{240} = 31.25$$

Differential gear assembly 28 is made up of worm wheels 20',22' having fixed bevel gears 24,26 which couple with differential bevel gears 30,32 to rotate output shaft 10. Backlash spring 34 preloads the differential gear assemble 28 and removes backlash from the system.

Figure 4:
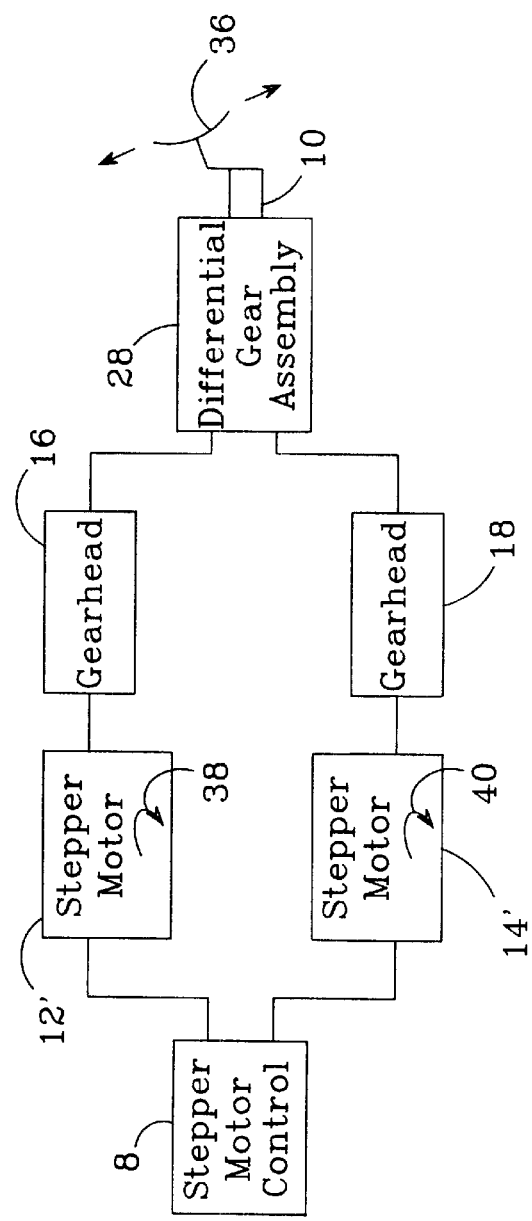
FIG. 4 is a block diagram of a gimbal system that is similar to FIG. 2 but uses offset step sizes rather than offset gear ratios.

An alternate embodiment of the invention illustrated in FIG. 4, is based upon control of the motor step size rather than an offset gear ratio. Elements that are common to both FIGS. 2 and 4 are numbered the same. In this embodiment the gear ratios of gearheads 16,18 relative to their respective worm wheels can be equal, but the step sizes of the stepper motors 12',14' are slightly offset, as indicated by the larger step rotation arrow 38 associated with stepper motor 12' than the step rotation arrow 40 associated with stepper motor 14'. The derivations of the step sizes needed to obtain a high resolution and high slew rate for one gimbal system are similar to those for FIG. 2. Substitution of step sizes m1 and m2 in the equations with equal gear ratios of 7500 yields the following equations:

motor step size=m1,m2 (degrees/step)

max step rate=r (step/sec.)

gear ratio=g1

ω=desired slew rate

θ=desired resolution $$\text{Slew rate} = \frac{r(m1 + m2)}{g1} = \tilde{\omega}$$

$$\text{Resolution} = \frac{m1 - m2}{g1} = \theta$$

The two equations can be solved for m1 and m2 to obtain:

$$m2 = \frac{g1}{2}\left(\frac{\tilde{\omega}}{r} - \theta\right)$$

$$m1 = \frac{g1}{2}\left(\frac{\tilde{\omega}}{r} + \theta\right)$$

Using a similar example as for FIG. 2, assume:
r=400 step/sec.
ω=5°/sec.
θ=0.0005°
g1=7500
m1=48.75°
m2=45°

The results achieved with the four modes of operation are the same as for FIG. 2:

| | |
|---|---|
| Fine pointing mode | resolution = 0.0005° |
| | slew rate = .2°/sec. |
| Slew mode | resolution = 0.0125° |
| | slew rate = 5°/sec. |
| Intermediate mode #1 | resolution = 0.0065° |
| | slew rate = 2.6°/sec. |
| Intermediate mode #2 | resolution = 0.0060° |
| | slew rate = 2.4°/sec. |

If both stepper motors in the present invention are operated, the question of redundancy is still addressed. If one of the motors shuts down for any reason the other motor is still available to be driven as necessary. The system is degraded but is still operable. Another option is to include redundant windings in each of the stepper motors.

While several embodiments of the invention have been shown and described, numerous variations and alternative embodiments will occur to those skilled in the art. For example, the invention is especially applicable to numerous mechanical arrangements in which two motors drive a single output shaft. Accordingly, it is intended that the invention be limited only in terms of the appended claims.

We claim:

1. A gimbal system, comprising:
    a plurality of stepper motors,
    a plurality of drive actuators driven by respective ones of said stepper motors,
    a differential drive assembly having simultaneous drive engagements with each of said drive actuators, and
    an output shaft rotated by said differential drive assembly,
    said stepper motors operating collectively to produce a net output shaft rotation, and each operating individually to produce mutually different output shaft rotations per step.

2. The gimbal system of claim 1, said stepper motors driving their respective drive actuators in different directions relative to said differential drive assembly to produce a slower output shaft rotation than the rotation produced by any of said stepper motors acting by themselves.

3. The gimbal system of claim 1, said stepper motors driving their respective drive actuators in the same direction relative to said differential drive assembly to produce a faster output shaft rotation than the rotation produced by any of said stepper motors acting by themselves.

4. The gimbal system of claim 1, one of said stepper motors actively driving its respective drive actuators and another of said stepper motors holding its respective drive actuator stationary.

5. The gimbal system of claim 1, wherein said drive actuators have different drive ratios with said differential drive assembly to establish said different output shaft rotations per stepper motor step.

6. The gimbal system of claim 1, wherein said stepper motors have different step sizes to establish said different output shaft rotations per stepper motor step.

7. The gimbal system of claim 1, further comprising a stepper motor control circuit connected to control the on/off state and drive direction of each stepper motor to enable said stepper motors to be selectively driven in the same direction, in opposite directions, or with only one stepper motor providing a drive to said differential drive assembly.

8. A gimbal system, comprising:
    a pair of stepper motors,
    a pair of drive actuators respectively driven by said stepper motors,
    a differential drive assembly having drive engagements with each of said drive actuators, said drive engagements having different drive ratios, said differential drive assembly receiving and combining drive outputs from each of said drive actuators to produce a net rotational output, and
    an output shaft driven by the rotation of said differential drive assembly.

9. The gimbal system of claim 8, wherein each drive actuator comprises a gearhead that drives a respective worm gear.

10. The gimbal system of claim 9, wherein said differential drive assembly comprises a differential gear assembly that includes a pair of worm wheels engaged by said worm gears, each said worm wheel having an associated bevel gear which rotates coaxially with it, and a pair of differential bevel gears coupled to said associated bevel gears, said differential bevel gears driving rotation of said output shaft.

11. The gimbal system of claim 8, further comprising a stepper motor control circuit connected to control the on/off state and drive direction of each stepper motor to enable said stepper motors to be selectively driven in the same direction, in opposite directions, or with only one stepper motor providing a drive to said differential drive assembly.

12. A gimbal system, comprising:

a pair of stepper motors having different drive step magnitudes, a pair of drive actuators respectively driven by said stepper motors, a differential drive assembly having drive engagements with each of said drive actuators, said differential drive assembly receiving and combining drive outputs from each of said drive actuators to produce a net rotational output which reflects the difference between the drive step magnitudes of said stepper motors, and an output shaft driven by the rotation of said differential drive assembly.

13. The gimbal system of claim 12, wherein each drive actuator comprises a gearhead that drives a respective worm gear.

14. The gimbal system of claim 13, wherein said differential drive assembly comprises a differential gear assembly that includes a pair of worm wheels engaged by said worm gears, each said worm wheel having an associated bevel gear which rotates coaxially with it, and a pair of differential bevel gears coupled to said associated bevel gears, said differential bevel gears driving rotation of said output shaft.

15. The gimbal system of claim 12, further comprising a stepper motor control circuit connected to control the on/off state and drive direction of each stepper motor to enable said stepper motors to be selectively driven in the same direction, in opposite directions, or with only one stepper motor providing a drive to said differential drive assembly.

\* \* \* \* \*